(12) United States Patent  (10) Patent No.: US 7,038,786 B2
Blake  (45) Date of Patent: May 2, 2006

(54) OPTICAL INTERFEROMETRIC SENSOR WITH MEASUREAND COMPENSATION THAT MAY SELECTIVELY BE USED FOR TEMPERATURE COMPENSATION AND LONG TERM LIFE DEGRADATION

(75) Inventor: James N. Blake, Paradise Valley, AZ (US)

(73) Assignee: NxtPhase T & D Corporation, Vancouver (CA)

( * ) Notice: Subject to any disclaimer, the term of this patent is extended or adjusted under 35 U.S.C. 154(b) by 302 days.

(21) Appl. No.: 10/271,523

(22) Filed: Oct. 15, 2002

(65) Prior Publication Data

US 2003/0095262 A1 May 22, 2003

Related U.S. Application Data

(60) Provisional application No. 60/329,817, filed on Oct. 16, 2001.

(51) Int. Cl.
*G01B 9/02* (2006.01)

(52) U.S. Cl. .................................... 356/483
(58) Field of Classification Search ................ 356/483, 356/460, 464; 385/12; 250/227.19, 227.27; 483/12

See application file for complete search history.

(56) References Cited

U.S. PATENT DOCUMENTS

| 5,696,858 A | 12/1997 | Blake |
| 5,811,964 A | 9/1998 | Bosselmann et al. |
| 5,953,121 A * | 9/1999 | Bohnert et al. ............. 356/481 |
| 6,046,810 A | 4/2000 | Sanders et al. |
| 6,122,415 A * | 9/2000 | Blake ........................... 385/12 |

FOREIGN PATENT DOCUMENTS

JP  57 184974  11/1982

OTHER PUBLICATIONS

International Search Report: PCT/US 02/32880 (5 pages).

* cited by examiner

*Primary Examiner*—Samuel A. Turner
(74) *Attorney, Agent, or Firm*—Robert A. Pajak

(57) ABSTRACT

In accordance with the preset invention, an optical interferometer employed as a current sensor is provided with visibility compensation and scale factor compensation. In accordance with the present invention, the interferometer is constructed so as to propagate a pair of optical beams along a defined optical path, where the optical interferometer includes a pair of optical beams that travel along at least a portion of the defined optical path such that a phase shift is induced between the pair of optical beams in response to a measureand, for example electrical current. At least one photodetector is responsive to at least a portion of the sum of the pair of optical beams and provide a beam output signal indicate thereof. From the beam output signal, a first signal is derived that is indicative of the visibility of the interferometer. A signal processor derives from the beam output signal an output signal indicative of the bias point of the interferometer, where the bias point is indicative of the induced phase shift in response to the measurand. A compensated interferometer output signal indicative of the induced phase shift is derived as a function of the visibility signal and bias point signal. In a specific embodiment of the invention, the visibility signal may simply be the output of a signal averaging circuit which in turn may adjust the gain of the signal processing circuit.

17 Claims, 3 Drawing Sheets

OPTICAL INTERFEROMETRIC SENSOR WITH MEASUREAND COMPENSATION THAT MAY SELECTIVELY BE USED FOR TEMPERATURE COMPENSATION AND LONG TERM LIFE DEGRADATION

RELATED APPLICATION

This application claims the benefit of priority pursuant to 35 USC 119 of provisional patent application Ser. No. 60/329,817 filed Oct. 16, 2001, the disclosure of which application is hereby incorporated in its entirety by reference herein.

FIELD OF THE INVENTION

The present invention relates generally to interferometers employed as optical sensors for measuring a selected measureand or parameter quantity. More specifically, the present invention is directed to fiber optic sensors employed as a current and/or voltage sensor.

BACKGROUND OF THE INVENTION

An optical interferometric sensor for sensing current, the measureand, is shown and described in U.S. Pat. No. 5,644,397, entitled, "Fiber Optic Interferometric Current and Magnetic Field Sensor," issued to the applicant of the present invention, and is incorporated herein by reference. In general, fiber optic current sensors work on the principle of the Faraday effect. Current flowing in a wire induces a magnetic field which, through the Faraday effect, rotates the plane of polarization of the light traveling in the optical fiber wound around the current carrying wire. Faraday's law, stated as:

$$I = \oint H dL$$

where I is the electrical current, H is the magnetic field, and the integral is taken over a closed path around the current. If the sensing fiber is wound around the current carrying wire with an integral number of turns, and each point in the sensing fiber has a constant sensitivity to the magnetic field, then the rotation of the plane of polarization of the light in the fiber depends on the current being carried in the wire, and is insensitive to all externally generated magnetic fields such as those caused by currents carried in nearby wires. The rotation of the state of polarization of the light due to the presence of an electrical current is measured by injecting light with a well-defined linear polarization state into the sensing region, and then analyzing the polarization state of the light after it exits the sensing region. Alternatively, a phase shift, $\Delta\phi$, between two counter-rotating circularly polarized optical beams is induced into the pair of such beams traveling in the loop around the current carrying conductor in the presence of a magnetic field caused by the current flowing through the conductor.

In U.S. Pat. No. 5,644,397, there shown is in-line or linear interferometric fiber optic sensor for measuring current and magnetic fields. As taught therein, a light wave or beam from a light source is split into a pair of light beams that travel along first and second principle eigen axes; a birefringence modulator is supplied by a waveform or waveforms to modulate the birefringent light beams; a quarter waveplate is set at 45 degrees to the principle axes of the fiber to convert the orthogonally linearly polarized pair of light beams to counter-rotating circularly polarized light prior to entering the sensing region. Upon reflection at the end of the fiber, the sense of rotation of the two light beams are reversed and the light waves travel back through the sensing region, converted back to a pair of linearly polarized light beams, and propagate toward a photodetector and impinge thereon. The two light beams or waves therefore undergo reciprocal paths and the same polarization evolution through the optical circuit.

The fiber optic sensors taught by Blake in the aforementioned patent overcame many disadvantages associated with conventional all fiber sensors. However, the sensor and sensing method still suffered from a particularly exacerbating problem that affects the accuracy of the sensor. That is, to have a very accurate measurement, the optical components, particularly the quarter waveplate, must be perfect and not be affected by external stresses such as temperature variations and mechanical disturbances. It is well recognized that perfect or nearly perfect quarter waveplate are difficult and very costly to manufacture to achieve accurate sensing required by certain applications.

Some of the aforesaid shortfalls or problems are overcome by another optical interferometric sensor as shown and described in U.S. Pat. No. 5,696,858, entitled, Fiber Optics Apparatus and Method for Accurate Current Sensing, issued to the same applicant as the present invention. The aforesaid patent is also herein incorporated by reference in part and its entirety. Shown in FIG. 1 (labeled prior art) is substantially FIG. 1 of the aforesaid patent, similar in structure to the previously mentioned U.S. Pat. No. 5,644,397.

The fiber optic current sensor based on the in-line interferometric configuration as shown and described in the aforementioned patents is ideally a two-beam interferometer. One beam travels down a polarization-maintaining (PM) fiber delay line in the x-polarization, and the other in the y-polarization. At the end of the PM fiber delay line, a quarter waveplate converts these two beams into RHCP and LHCP circular polarization states.

The quarter waveplate generally defines the beginning of the sensing region. The sensing fiber which follows—that part of the optical path where the pair of beams are affected by the measureand, ideally maintains the circular polarization states of the two beams. The two beams accordingly accumulate a phase shift in proportion to the magnetic field along the fiber. Generally, the sensing fiber is wound in multiple loops and terminates in a mirror located in close proximity to the spatial position of the quarter waveplate.

For a current sensor, the sensing fiber comprises a "closed path" around the current carrying conductor, and the total accumulated phase shift experienced between the two beams is related to the closed integral of the magnetic field around the conductor, which by Ampere's law is linearly related to the current carried by the conductor.

Continuing, the in-line interferometer is such that the pair of light beams swap circular states of polarization upon reflection from the mirror, and continue to accumulate a phase shift or difference as the pair of beams travel through the sensing fiber in the opposite direction but with opposite polarization states,—the beam that traveled through the sensing fiber as a RHCP beam returns as a LHCP beam.

Upon again reaching the quarter waveplate from the opposite direction, the two beams are returned to linear polarization states. However, the original x-polarized beam returns as a y-polarized light beam for the return trip. The returning two linear polarized light beams are "interfered" in the polarizer, and the interfered light is routed to impinge upon a photodetector that provides an output signal related to the sum of the pair of light beams impinging thereon. In turn, signal processing electronics responsive to the output of the photodetector provides an output signal indicative of the current flowing in the conductor or another selected measureand for differing applications.

In the ideal in-line fiber optic current sensor described above, the two beams interfere with perfect "visibility", and the phase shift between them is linearly related to the current in the conductor passing through the sensing region. In a practical embodiment, a birefringence modulator is advantageously placed serially in the PM fiber delay line to modulate the phase difference between the two interfering beams to aid in the detection of the conductor current induced phase shift as taught in the aforementioned current sensor patents. However, errors arise in the in-line fiber optic current sensor when stray polarization coupling points exist in the optical circuit. These stray polarization coupling points can be due to imperfect splices, imperfect connectors, an imperfect quarter waveplate, or the like.

Light that has cross-coupled in the optical circuit exhibits itself in two important ways. First, some light that eventually participates in the interference has traveled through the sensing region in the wrong polarization state and picks up the wrong phase shift from the current flowing in the conductor or a particular measureand. This cross coupled light acts to alter the relationship (or "scale factor") between the current flowing in the conductor and the phase shift interpreted to exist by the signal processing electronics. Second, some light travels an incoherent path with respect to the main interfering waves, and adds an "offset DC component" of light to the photo-detector.

It is important to note that the amount of offset DC light falling on the photodetector is related to the amount of light existing in the spurious coherent waves that shift the scale factor of the sensor. This principle has been noted in and described in the aforementioned U.S. Pat. No. 5,696,858, and was there used to show that by normalizing the sensor output to the peak intensity observed at the photodetector for a modulated system, the errors due to these cross-coupling effects can be reduced from second order to fourth order.

Although the just mentioned patent and solution provided marked improvement, certain sensor applications require consideration of the fourth order errors, and thus there is a need for a further improvement in the optical interferometric sensor of the prior art.

BRIEF DESCRIPTION OF THE INVENTION

An object of the invention is to provide visibility compensation and scale factor compensation for an optical interferometric sensor.

An object of the invention is to provide visibility compensation and scale factor compensation for an optical interferometric current sensor for measuring current through a conductor. In accordance with the present invention, the interferometer is constructed so as to propagate a pair of optical beams along a defined optical path, where the optical interferometer includes a pair of optical beams that travel along at least a portion of the defined optical path such that a phase shift is induced between the pair of optical beams in response to a measureand, for example electrical current. At least one photodetector is responsive to at least a portion of the sum of said first and second optical beams and provide a beam output signal indicate thereof. From the beam output signal, a first signal is derived that is indicative of the visibility of the interferometer. A second signal is derived from the beam output signal indicative of the bias point of the interferometer, where the bias point is indicative of the induced phase shift in response to the measureand. An interferometer output signal indicative of the induced phase shift is derived as a function of the visibility signal and bias point signal. In a specific embodiment of the invention, the visibility signal may simply be the output of a signal averaging circuit, and the bias point may derived from a peak intensity detection circuit.

DETAILED DESCRIPTION OF THE INVENTION

Figure 1:
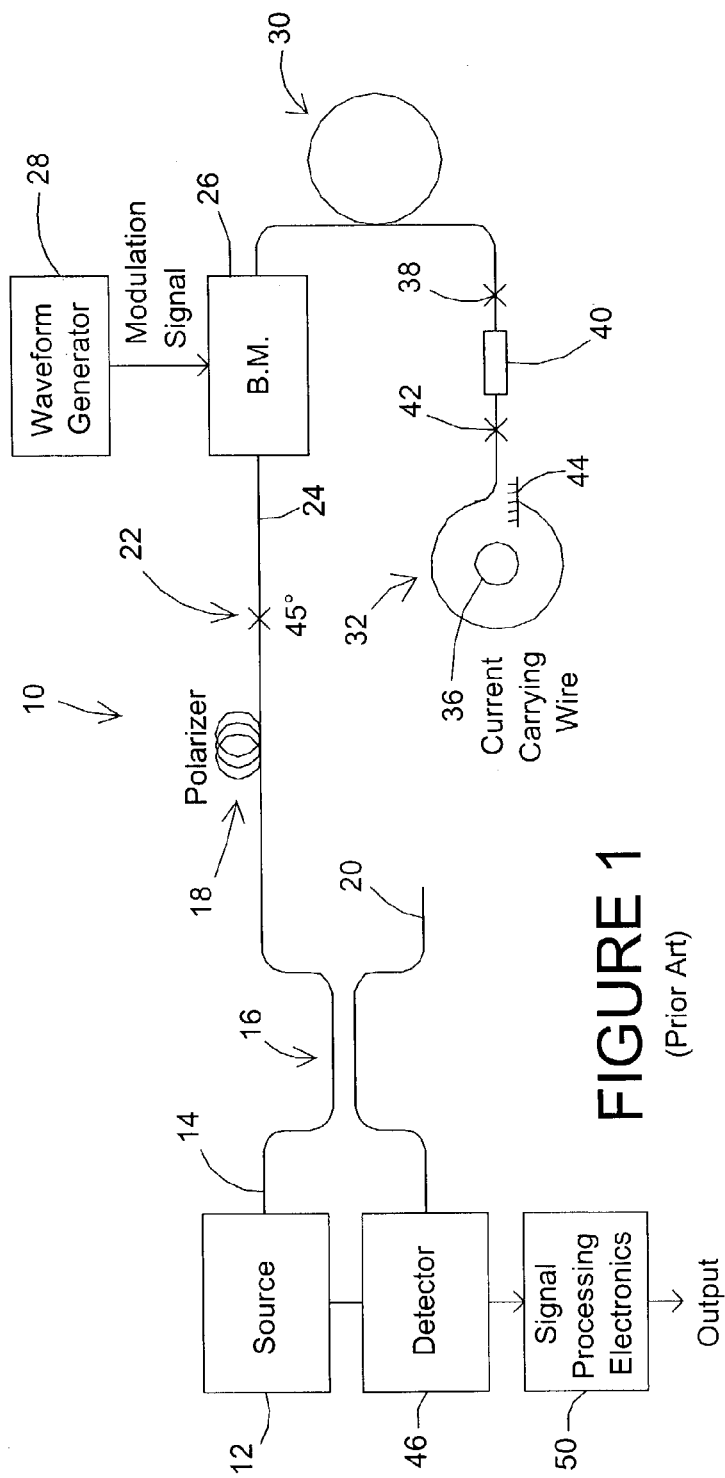
FIGS. 1 is a block diagram of the prior art optical interferometric sensor as taught in U.S. Pat. No. 5,696,858, and is substantially FIG. 1 of the aforesaid patent.
Figure 2:
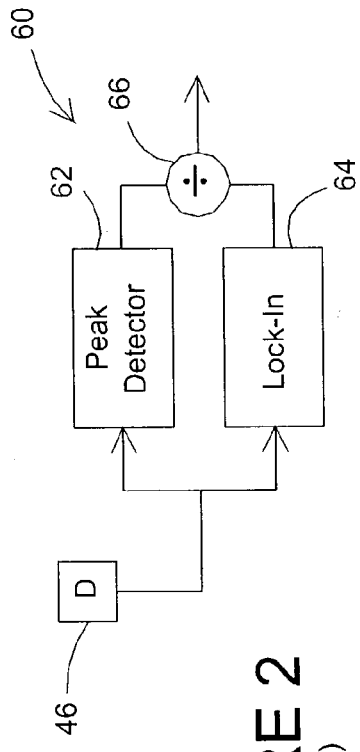
FIG. 2 is a block diagram of an exemplary signal processing circuit according the teachings of U.S. Pat. No. 5,696,858, and is substantially FIG. 3 of the aforesaid patent

The technique employed under U.S. Pat. No. 5,696,858, herein incorporated by reference, sets forth an important step forward in reducing polarization cross-coupling errors in an optical interferometric sensor. As indicated earlier, external stresses and disturbances result in the optical circuit introducing light of the wrong state of polarization into the optical path. This was recognized as to leading to scale factor error in the measurement, and exhibited itself in an extra incoherent DC-light detected by the detector. Further it was recognized that the presence and magnitude of the extra incoherent DC-light may be used to provide a normalizing factor to compensate for the induced scale factor error caused by the cross-coupling.

Although the technique just described is important, it however is insufficient to mitigate the errors to an acceptable level in practice. More specifically, fiber optic component quality, especially that of the PM (polarization maintaining) fiber connectors are still quite poor that the fourth order errors left over from normalizing the signal to the peak intensity still need to be further suppressed. Additional errors due to polarization cross-couplings in the sensing region, and backscatter, contribute to scale factor and offset DC-light errors. Accordingly, what is needed is a secondary compensation technique to further suppress scale factor errors after the peak normalization procedure has been applied.

It should noted that servoing the peak intensity to a constant value by controlling the light source intensity (FIG. 3) and alternatively dividing the output signal by the peak intensity (FIG. 4) are equivalent methods of accomplishing the peak beam intensity normalization.

In mathematically describing the technique of the present invention, consider a specific case of polarization cross-coupling and the effects it has on the output signal indicative of the measureand of the optical interferometric sensor, and in the limiting case as a current sensor. Consider an otherwise ideal in-line interferometer with reference to FIG. 3 having an arbitrary polarization cross-coupling point somewhere between the birefringence modulator and the beginning of the sensing region (including an error within the quarter waveplate). The Jones matrix describing this arbitrary situation is written as:

$$\begin{pmatrix} A & B \\ -B^* & A^* \end{pmatrix}.$$

This unitary matrix represents any and all polarization independent loss elements that exist between the modulator and the quarter waveplate. A calculation shows the intensity of the light falling on the photo-detector, I (after normalization to system loss and light source power) to be:

$$I = |A|^2|B|^2\{1 - \cos[m(t)]\} + \frac{1}{2}|A|^4\{1 + \cos[m(t) - F]\} + \frac{1}{2}|B|^4\{1 + \cos[m(t) + F]\} \quad (1)$$

where
  m(t) is the phase difference modulation waveform applied to the sensor, and
  F is the measurand to be sensed.
Further, we can apply the energy conserving relation $|A|^2+|B|^2=1$.
  Ideally $|B|=0$ and $|A|=1$. Errors arise when $|B|\neq 0$.
  The peak of the waveform, $I_{peak}$, occurs when F and m(t) are zero.

$$I_{peak}=1-2|B|^2+2|B|^4 \quad (2)$$

The demodulation is ideally set to recover F when $|B|=0$. The output of the demodulator circuit yields a scale factor, SF, to be:

$$SF=1-2|B|^2. \quad (3)$$

At this point, it may be see that if the fourth order term is too small to be significant, SF varies directly with $I_{peak}$ and the normalization of SF to $I_{peak}$ makes the scale factor immune to the polarization cross-coupling.

However, as this is not good enough for all applications, we proceed further to develop a new signal, $I_{mean}$, which is the value of the waveform l(t) when the modulation signal, m(t) passes through $\pi/2$ (and F=0).

$$I_{mean}=\frac{1}{2}. \quad (4)$$

The values of $I_{peak}$, $I_{mean}$, and SF can be easily related together using the classical concept of "visibility", V, in an interferometer. Namely, $$V=1-4|B|^2+4|B|^4 \quad (5)$$

Normalizing to the peak intensity, we find the normalized scale factor, $SF_{norm}$, and the normalized mean intensity, $I_{norm-mean}$, to be:

$$SF_{norm} = \frac{SF}{I_{peak}} = \frac{2\sqrt{V}}{1+V} \quad (6)$$

and $$I_{norm-mean} = \frac{I_{mean}}{I_{peak}} = \frac{1}{1+V} \quad (7)$$

From these relationships, it may be seen that there is a one-to-one-to one relationship between the visibility of the interferometer, the normalized mean intensity, and the normalized scale factor of the sensor. One does not have to directly detect the visibility of the interferometer to compensate the scale factor. Specifically, one can measure (for example) the normalized mean intensity as defined above. In addition, one can measure many other equivalent signatures of the output waveform l(t) to derive a parameter that is related to the visibility of the interferometer that can in turn be used to compensate the normalized scale factor for changes in the "visibility" of the interferometer.

Other easy-to-implement possibilities and corresponding configurations that can substitute for $I_{norm-mean}$ include the DC value of the light falling on the photo-detector, or the minimum amount of light falling on the photo-detector.

Assuming the "visibility" of the interferometer varies around a mean value of $V_0$, we can differentiate (6) and (7) to obtain a linear compensation relationship:

$$\frac{\Delta SF_{NORM}/SF_{NORM}}{\Delta I_{NORM-MEAN}/I_{NORM-MEAN}} = \frac{V_0-1}{2V_0} \quad (8)$$

If the interferometer is built with a nominal visibility $V_0$, then the gain of the output can be adjusted as $I_{norm-mean}$ varies over temperature and the life of the sensor. This relationship shows that if $I_{norm-mean}$ increases in time, the gain of the output should be increased by a corresponding fractional amount given by $$\left|\frac{V_0-1}{2V_0}\right|.$$

Linearized compensation is easy to implement, but square-law, or look-up compensation can also be implemented to cover a wider range of visibility variation over the life of the sensor, all of which are intended to be within the true spirit and scope of the present invention.

Temperature Compensation

In addition to correcting for visibility changes in the interferometer, this compensation technique can also be used to correct for a more fundamental change in the sensor's scale factor over temperature. For example, for the current sensor, the Verdet constant, which relates the phase shift between the two interfering waves and the magnetic field induced by the current, linearly changes with temperature. The change in the Verdet constant over temperature is accompanied by a change in the quarter waveplate over temperature. A changing quarter waveplate changes the visibility in the interferometer, and a signal such as $I_{norm-mean}$ can be used to measure that change in visibility, and thus the absolute temperature of the quarter waveplate. In this case, the temperature of the sensing fiber can be known and the output gain can be accordingly adjusted to offset scale factor changes due to Verdet constant changes.

Long Term Health

This technique can further be used to monitor the long-term health of the interferometer. By monitoring $I_{norm-mean}$ long term, one can tell whether the interferometer has remained healthy. Normally, the interferometer can be considered accurate if the conditions of the interferometer have not significantly changed. Significant change in visibility in the in-line interferometer is an indication of many things that can go wrong, such as increased backscatter due to a crack in the fiber, source wavelength change due to source aging or malfunction, large polarization cross-coupling due to some developing stress on a fiber, or photodetector offsets due to failing electronic components. The sensor may be advantageously alarmed to alert the user if the visibility of the interferometer drifts beyond some preset limits. This, of course, may be accomplished by simple comparators and alarm circuits as illustrated in part in FIG. 3.

Figure 3:
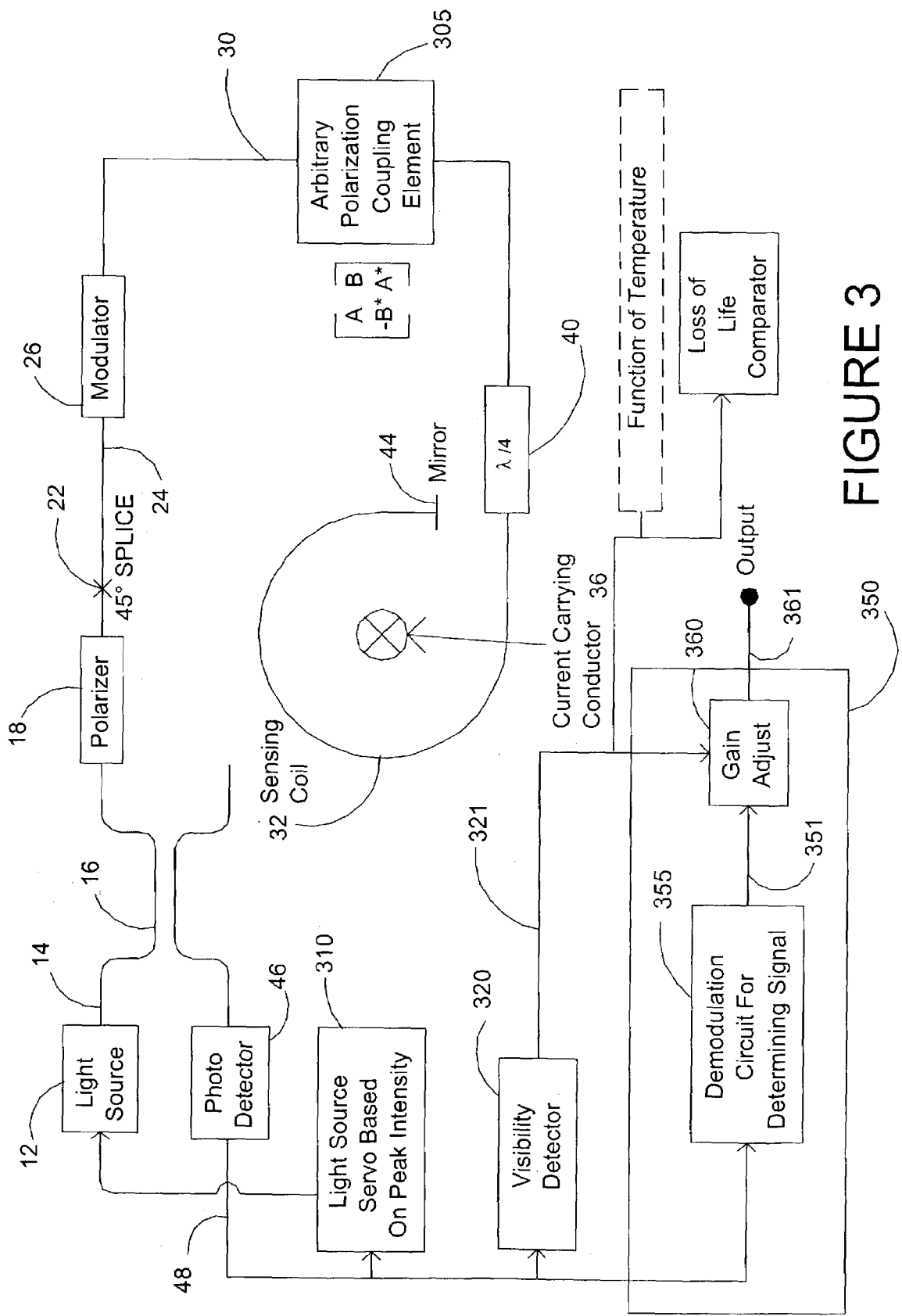
FIG. 3 is a block diagram of an optical interferometric sensor in accordance with the present invention.

FIG. 3 is an exemplary embodiment of the invention. Many components therein have been already described with reference to U.S. Pat. No. 5,696,858 incorporated herein and noted in the prior art block diagram of FIG. 1. In FIG. 3, like components as those in FIG. 1 serving the same function have retained the same numeral designation.

In FIG. 3, the optical circuit from the light source 12 to the photodetector is substantially that shown in FIG. 1 and will not be explained herein except for the aforesaid arbitrary coupling element designated numeral 305 which represents loss and cross-coupling. The coupling element block 305 is analogous to showing parasitic capacitance and inherent resistance in electrical conductors which are commonly ignored. However, these error sources, namely loss and cross-coupling, are intended to be compensated in accordance with the present invention by way of detecting or providing an indication of the visibility factor of the interferometer.

As illustrated in FIG. 3, a photo detector 46 is responsive to the sum of the pair of optical beams which travel along the optical path and exit therefrom and impinge upon the photodetector. Photodetector 46 accordingly provides a signal 48 indicative of the sum of the interfering pair of optical beams. In turn, the detector output signal 48 is provided as an input to the signal processing electronics or circuitry 350 which includes a modulation signal generator (not shown) which is coupled to modulator 26, and demodulation circuitry 355 for providing an output signal 351 indicative of the measureand of the optical interferometric sensor, or in the limiting sense, current in conductor 36 as is well known in the art.

As taught in the aforesaid U.S. Pat. No. 5,696,858, detector signal 48 is provided as an input to a light source servo 310 which is coupled to the light source 12 for maintaining a constant light intensity for purposes as already described for obviating light loss. Light source servo 310 is generally responsive to the peak intensity if the output of the photodetector, namely the peak value of the photodetector output signal 48.

Further, the photodetector output signal 18 is also provided as an input to visibility detector 320 having an output signal 321 indicative of the "visibility" of the interferometer.

Gain adjustment circuitry is indicated by gain adjust block 360 having an output signal 361, and input means for receiving input signal 321 from the visibility detector and input signal 351 from the measureand signal processing block 350. Gain adjust block 360 serves as a multiplier of the measureand output signal 351 having a multiplication factor that is a function of the visibility detector output signal 321. In the simplest scenario, gain adjust block 360 is a simple multiplier or amplifier having gain that is a linear function of the visibility detector output signal 321.

In operation, the scale factor errors due to DC offset and cross-coupling errors and resulting changes in visibility are reduced in a manner as mathematically described in foregoing exposition.

It should be recognized that although a separate gain adjust block 360 has been illustrated, the visibility detector output signal 321 may be coupled into the ordinary demodulation circuit to adjust the gain thereof and derive the desired measureand, namely current for a current sensor.

One method of detecting "visibility" of the interferometer is to detect average power, e.g., by way of a low pass filter. On the other hand, other schemes are of course possible, including among others, detecting the upper and lower values of the detector output, as well as a wide variety of control schemes.

Figure 4:
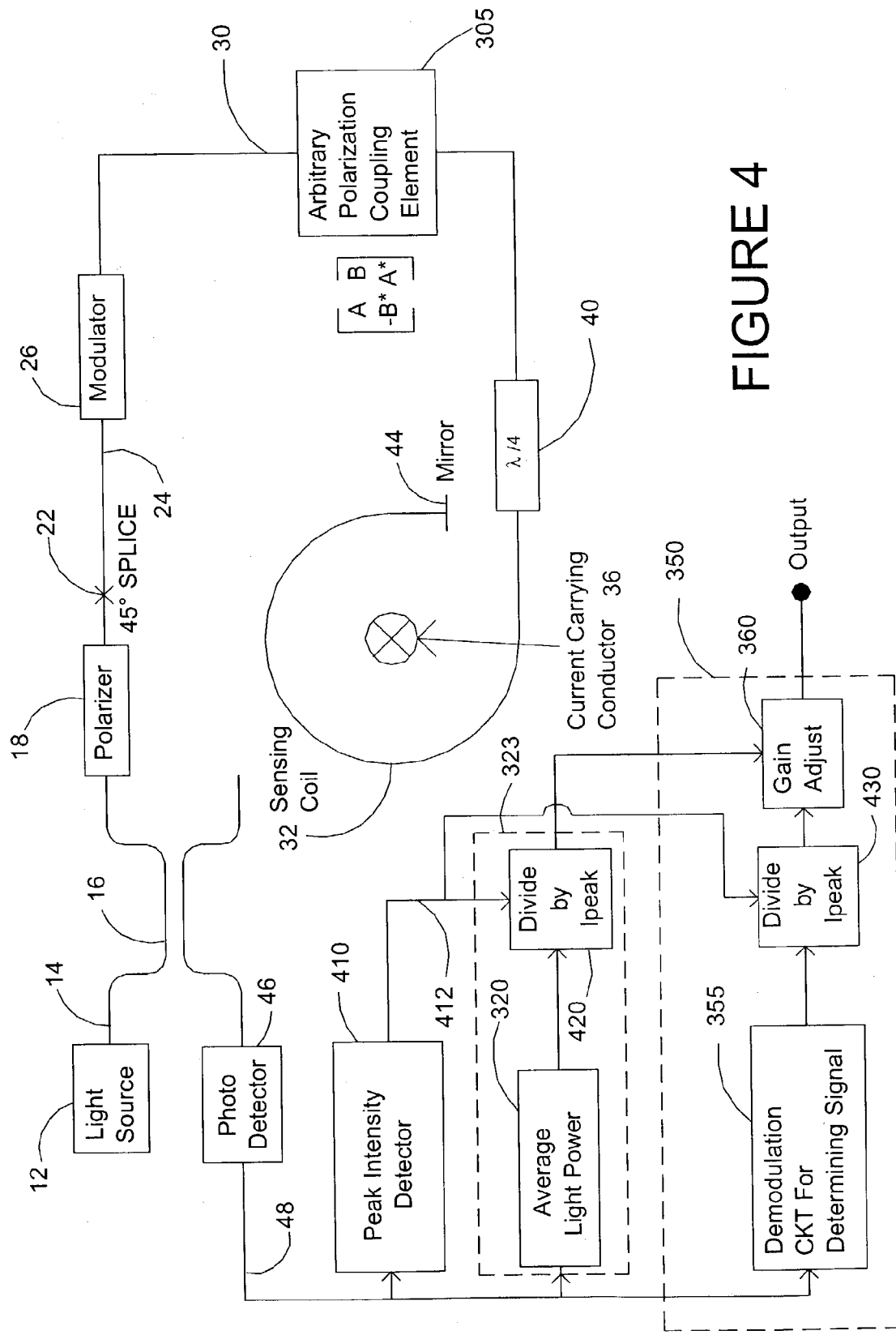
FIG. 4 is another block diagram of an optical interferometric sensor in accordance with the present invention illustrating an alternate arrangement.

Illustrated in FIG. 4 is a block diagram of an alternate arrangement of the present invention. In FIG. 4, like components of those in FIGS. 1 and 3 have retained the same numeral designations as in FIG. 3.

In FIG. 4, light source servo is replaced by a simple peak intensity detector 410 for providing an output signal 412 indicative of the peak intensity of the photodetector output signal 48. A divider 420 is connected between the output of the visibility detector 320 and gain adjust block 360. Similarly, a divider 430 is connected between the output of the demodulation block 355 and gain adjust block 360. Each of the dividers 420 and 430 receive as an input the output of the peak intensity detector 410 for dividing the corresponding input by a value that is a function of the peak intensity of the photodetector output signal 48.

It should be recognized by those skilled in the art that a "divider" effectively attenuates any signal passing therethrough. Accordingly, although the dividers 420 and 430 are shown separate from the visibility detector and demodulator, each may be incorporate attenuation circuitry or signal processing to achieve the intended function of normalization to rid their respective outputs of variations due to intensity changes of the pair of optical beams. It should be further understood that peak intensity associated with the pair of optical beams may be derived from the photodetector output signal in a variety of ways as set forth in the aforementioned U.S. Pat. No. 5,696,858. These and other techniques, are of course, within the true spirit and scope of the present invention, and such variations in construction are of curse possible.

It should be appreciated that the error sources indicated herein occur commonly in a wide variety of interferometric type sensors, as well in linear light wave or light beam optical circuits, all of which are intended to be within the true sprit and scope of the present invention. Further, it should be recognized that the present invention is applicable to a wide variety of interferometric type sensors, both in-line and Sagnac, having a wide variety of optical circuit arrangements, all of which are intended to be within the true spirit and scope of the present invention.

Further, it should be noted that digitization of the entire scheme is of course possible using a wide array of digital techniques including D/A & A/D converter, processors, and the like, and including firmware and software applications to process the detector output so as to achieve compensated sensor output in accordance with the present invention.

Temperature Compensation

As indicated earlier, the present invention is applicable for providing internal temperature compensation derived from optically measured temperature of the interferometer. Accordingly, practice of the present invention permits the construction of a portable or field useable current calibration device or other measureand calibrating device. This may be accomplished by internally compensating for temperature in the sensing head. Compensation may be accomplished using optically measured temperature at the sensing head and correcting the scale factor of the sensor with it. The temperature of the sensing head can be determined using the fact that the quarter waveplate in the sensing head varies over temperature. As the quarter waveplate deviates from perfection, some of the light in the sensor ceases to participate in the interferometer and creates an excess background light falling on the photodetector. The amount of "excess light" falling on the photodetector is a direct function of the quarter waveplate action, which in turn is a direct function of its temperature. The excess light on the photodetector is determined in the signal processing electronics in a manner as already described, and also used there to digitally correct the scale factor of the sensor. An exemplary scale factor compensation algorithm uses a linear fit to excess light as determined by the visibility detector.

While the present invention has been particularly shown and described with reference to the accompanying figures, it will be understood, however, that other modifications thereto are of course possible, all of which are intended to be within the true spirit and scope of the present invention. Various changes in form and detail may be made therein without departing from the true spirit and scope of the invention as defined by the appended claims.

I claim:

1. An optical interferometric sensor for providing an output signal indicative of a measureand intended to be sensed, the optical sensor comprising:
    an optical interferometer, including first and second light waves that travel along a selected optical path established by selected optical components, where,
        said first and second light waves aligned in such a manner so as to permit the first and second light waves to interfere with each other at a first spatial location,
        at least a portion of the defined optical path is configured such that a phase shift is induced between the first and second light waves in response to a measureand, and
        at least one photodetector responsive to at least a portion of the sum of said first and second light waves impinging thereon, and providing a detector signal indicative of said sum;
    first signal processing means responsive to said detector signal for providing a visibility signal indicative of the visibility parameter of the interferometer, and wherein said visibility signal is a function of the temperature of said optical components that define said defined optical path, and also indicative of the long term life performance of said optical components;
    second signal processing means responsive to said detector signal and said visibility signal for providing a first output signal indicative of said induced phase shift in response to the measurand intended to be measured; and
    third signal processing means responsive to said first output signal and said visibility signal for providing a second output signal indicative of said induced phase shift in response to the measurand including error compensation induced by temperature and long term life performance changes in said a optical components.

2. The optical interferometric sensor of claim 1 wherein the measurand is a selected one of electrical current flowing through a conductor and a voltage sensor.

3. The optical interferometric sensor of claim 1 wherein said visibility signal is indicative of interferometer temperature.

4. The optical interferometric sensor of claim 1 wherein said first signal processing means is operative such that said visibility signal is indicative of the long-term average value of said-sum of first and second light waves.

5. The optical interferometric sensor of claim 4 further including signal processing means for comparing said visibility signal of the interferometer with a preselected limit indicative of interferometer loss of accuracy limit, and providing an output signal indicative of said comparison.

6. The optical interferometric sensor of claim 1 wherein said second signal processing means includes,
    signal modulator for modulating the phase shift between said first and second light waves, and
    signal demodulator for demodulating said detector signal and providing a demodulation signal indicative thereof.

7. The optical interferometric sensor of claim 6 further comprising:
    fourth signal processing means responsive to said detector signal for providing a peak signal indicative of the peak intensity of said sum of said first and second light waves; and
    wherein said first signal processing means is operative for attenuating said visibility signal in response to said peak signal, and
    wherein said signal demodulator is operative for attenuating said demodulation signal in response to said peak signal and said visibility signal.

8. The optical interferometric sensor of claim 1 wherein said first signal processing means is operative for determining the average value of said detector signal, and said visibility signal is indicative of said average value.

9. The optical interferometric sensor of claim 8 wherein said first signal processing means includes a low pass filter for determining the average value of said sum of said first and second light waves.

10. The optical interferometric sensor of claim 8 further comprising:
    means for determining the peak value of said detector signal indicative of the peak intensity of said of first and second light waves, and providing a peak signal indicative thereof; and
    means for selective controlling the peak intensity of said first and second light waves or normalizing said visibility signal and second signal processing output signal in response to said peak signal.

11. The optical interferometric sensor of claim 1 further comprising:
    fourth signal processing means responsive to said detector signal for providing a peak signal indicative of the peak intensity of said sum of said first and second light waves; and
    source control means for controlling the peak value of said first and second light waves as a function of said peak signal so as to maintain the intensity of said first and second light waves substantially a constant.

12. The optical interferometric sensor of claim 1 further comprising:
    fourth signal processing means responsive to said detector signal for providing a peak signal indicative of the peak intensity of said sum of said first and second light waves; and
    wherein said second signal processing means is responsive to said detector output signal, said visibility signal, and said peak signal for providing said output signal as a function thereof.

13. An optical interferometric current sensor for providing an output signal indicative of an electrical current passing through a conductor, the optical current sensor comprising:

an optical interferometer, including a pair of light waves that travel along a defined optical path, where, said pair of light waves are aligned in such a manner so as to permit the pair of light waves to interfere with each other at a first spatial location,
- at least a portion of the defined optical path is configured such that a phase shift is induced between the pair of light waves in response to an electrical current intended to be measured, and
- at least one photodetector responsive to at least a portion of the sum of said pair of light waves and providing a detector signal indicate thereof;

first signal processing means responsive to said detector signal for providing a visibility signal indicative of the visibility parameter of the interferometer;

second signal processing means responsive to said detector signal and said visibility signal for providing an output signal indicative of said induced phase shift in response to the electrical current intended to be measured.

14. A fiber optic sensor, comprising:

a polarization maintaining optic fiber forming an optical path;

two linearly polarized light waves traveling in said polarization maintaining optic fiber on said optical path;

at least one quarter waveplate coupled to said optic fiber for converting said two linearly polarized light waves into two circularly polarized light waves traveling on said optical path toward a sensing region;

said sensing region including a sensing medium coupled to said polarization maintaining optic fiber at generally a mid-point in said optical path, said circularly polarized light waves passing through said sensing medium experiencing a differential phase shift caused by a magnetic field or current flowing in a conductor proximate to said sensing region;

a detector coupled to said optic fiber detecting said differential phase shift in said circularly polarized light waves producing an output signal correlative to a magnitude of said magnetic field or said current, said detector output signal including an incoherent D.C. light component introduced by imperfections in said quarter waveplate;

first signal processing means responsive to said detector output signal for providing a first signal indicative of the visibility of the sensor, and wherein said first signal processing means is operative for determining the average of said detector output signal and providing said first signal indicative thereof; and second signal processing means for receiving said detector output signal and correcting said detected magnitude in response,
- to said incoherent D.C. light component in said detector output signal, and
- to said first signal indicative of the visibility of the optical current sensor so as to provide an accurate sensor measurement.

15. A method of compensating an optical interferometer for optically sensing a measureand wherein the optical interferometric sensor includes first and second light waves that travel along a defined optical path, and at least a portion of the defined optical path is configured such that a phase shift is induced between the first and second light waves in response to a measureand, the method comprising the steps of:

detecting the sum of said first and second optical beams having passed through said defined optical path, and providing a detector signal indicate thereof;

determining the visibility of the interferometer in response to said beam signal and providing a visibility signal indicative thereof, where said visibility signal is indicative of the average value of said detector signal;

determining a phase shift in said first and second light waves indicative of said measureand in response to said detector signal as a function of said visibility signal.

16. The method of claim 15 further including the steps of:

determining the peak value of said detector signal which is indicative of the peak intensity of said of first and second light waves, and providing a peak signal indicative thereof; and controlling the peak value of said first and second light waves as a function of said peak signal so as to maintain the intensity of said first and second light waves substantially a constant.

17. The method of claim 15 further including the steps of:

determining the peak value of said detector signal which is indicative of the peak intensity of said of first and second light waves, and providing a peak signal indicative thereof; and wherein said step of determining the phase shift output signal indicative of the measureand is a function of said peak signal so as to provide scale factor compensation in relation to variations in intensity of said first and second light waves.

* * * * *